United States Patent
Hallivuori et al.

(10) Patent No.: US 10,326,654 B2
(45) Date of Patent: Jun. 18, 2019

(54) METHOD AND A DEVICE FOR OPTIMIZING A CONFIGURATION SYSTEM OF A NETWORK ELEMENT OF A SOFTWARE-DEFINED NETWORK

(71) Applicant: Tellabs Oy, Espoo (FI)

(72) Inventors: Ville Hallivuori, Espoo (FI); Juhamatti Kuusisaari, Helsinki (FI)

(73) Assignee: CORIANT OY, Espoo (FI)

(*) Notice: Subject to any disclaimer, the term of this patent is extended or adjusted under 35 U.S.C. 154(b) by 913 days.

(21) Appl. No.: 14/258,425

(22) Filed: Apr. 22, 2014

(65) Prior Publication Data

US 2014/0317251 A1    Oct. 23, 2014

(30) Foreign Application Priority Data

Apr. 23, 2013  (FI) .................................... 20135413

(51) Int. Cl.
G06F 15/16    (2006.01)
H04L 12/24    (2006.01)

(52) U.S. Cl.
CPC ................. *H04L 41/0823* (2013.01)

(58) Field of Classification Search
CPC .................................................. H04L 41/0823
(Continued)

(56) References Cited

U.S. PATENT DOCUMENTS

2011/0188386 A1    8/2011 Nicholson et al.
2012/0147894 A1    6/2012 Mulligan et al.
(Continued)

FOREIGN PATENT DOCUMENTS

EP    2 544 409 A1    1/2013
WO    2009/042919 A2    4/2009

OTHER PUBLICATIONS

Open Networking Foundation. OpenFlow Switch Specification [online]. Version 1.3.1 (Wire Protocol Ox04), Sep. 6, 2012 [retrieved on Nov. 25, 2013], Retrieved from the Internet: <URL:https://www.opennetworking.org/images/stories/downloads/sdn-resources/onfspecifications/openflow/openflow-spec-v1.3.1.pdf>the whole document, Cited in FI Search Report.
(Continued)

*Primary Examiner* — Normin Abedin
(74) *Attorney, Agent, or Firm* — Young & Thompson

(57) ABSTRACT

A method for optimizing entity-specific configuration systems for functional entities of a network element of a software-defined network is presented. The entity-specific configuration systems are based on a network element-specific configuration system related to the whole network element and comprising configuration entries for determining operations to be carried out by the network element. The method comprises forming (401) relation data that indicates, for each of the functional entities, those of the configuration entries which are irrelevant to the functional entity under consideration so that operation of the functional entity is independent of these configuration entries. The relation data enables the entity-specific configuration systems to be constructed (402) so that the entity-specific configuration system of each functional entity is free from those configuration entries which, according to the relation data, are irrelevant to the functional entity under consideration. Therefore, resources for implementing the entity-specific configuration systems can be saved.

18 Claims, 5 Drawing Sheets

(58) Field of Classification Search
USPC .......................................................... 709/221
See application file for complete search history.

(56) References Cited

U.S. PATENT DOCUMENTS

| | | |
|---|---|---|
| 2012/0155467 A1 | 6/2012 | Appenzeller |
| 2013/0010600 A1 | 1/2013 | Jocha et al. |
| 2013/0058215 A1 | 3/2013 | Koponen et al. |
| 2013/0070762 A1 | 3/2013 | Adams et al. |
| 2013/0163427 A1* | 6/2013 | Beliveau ............... H04L 67/327 370/235 |
| 2014/0098669 A1* | 4/2014 | Garg ....................... H04L 45/38 370/235 |
| 2014/0129687 A1 | 5/2014 | Halpern |

OTHER PUBLICATIONS

FI Search Report, dated Dec. 5, 2013, from corresponding FI application.
Open Network Foundation. OpenFlow Management and Configuration Protocol (OF-Config 1.1.1), [online] Version 1.1.1, Mar. 23, 2013, adapted on Mar. 27, 2013 [retrieved on Nov. 25, 2013], Retrieved from the Internet: <URL: https://www.opennetworking.org/images/stories/downloads/sdn-resources/onfspecifications/openflow-config/of-config-1-1-1.pdf>.
"Openflow Switch Specification Version 1.1.0 Implemented", Internet citation, Feb. 28, 2011, Retrieved from the Internet: URL:http://web.archive.org/web/20110516201950/http://www.openflow.org/documents/openflow-spec-v1.1.0.pdf [retrieved on Jan. 24, 2014], XP008166938.
European Search Report, dated Aug. 11, 2014, from corresponding EP application.

* cited by examiner

METHOD AND A DEVICE FOR OPTIMIZING A CONFIGURATION SYSTEM OF A NETWORK ELEMENT OF A SOFTWARE-DEFINED NETWORK

FIELD OF THE INVENTION

The invention relates generally to a software-defined network "SDN". More particularly, the invention relates to a method, a device, and a computer program for optimizing entity-specific configuration systems for functional entities of a network element of a software-defined network. The functional entities can be, for example, line interface modules. Furthermore, the invention relates to a controller of a software-defined network and to a network element of a software-defined network.

BACKGROUND

Software-defined networking is an emerging architecture for data transfer networks. In a software-defined network "SDN", the control plane is separated from the data plane so that the control plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the software-defined networking allows for quick experimenting and optimization of switching and/or routing policies and external access to the innards of network elements that formerly were closed and proprietary.

Internet Protocol "IP" based networks were initially built based on the concept of Autonomous Systems "AS". This concept allows networks to scale and extend by connected junctions that forward packets to a reasonable next hop based on partial need-to-know information. The AS principle works much like the traditional post office service, where a postal worker in a given city does not need to know all the tenants of all the streets in another city in order to choose a reasonable next hop for a letter at hand. This approach to networking is simple, and has proven resilient and scalable. This approach has, however, a few drawbacks. It does not allow the designated destinations, or tenants with home mail-boxes, to move without changing their identity as far as the packet delivery service is concerned. The topological location of destinations, which is the network interface they are attached to, dictates their identity related to the packet delivery service. In addition, using only the basic AS principle, it is hard to specify other qualities, such as logical grouping, access control, quality of service, intermediate network processing, or to specify aspects that relate to a sequence of packets that form a flow.

Using the analogy of the postal service, the software-defined networking works, for any given street location, so that all the letters from all the tenants would first be aggregated by a network element on an edge of a software-defined network. This network element is configured to examine the current location for each of the letter-destinations using a global lookup mechanism. Based on that global lookup and on other globally defined and globally measured considerations, such as access control or remote location load conditions, the said network element places one or more of the original letters in an additional envelope addressed to each of the street locations where the destinations currently are. It then uses the normal postal service which works like the traditional Internet Protocol "IP" to get these outer envelopes to the remote locations. This is done based on the existing and scalable hop-by-hop forwarding services. The outer letters are then opened by a remote network element and the original envelopes are delivered to the destinations. It is to be noted that the above-presented analogy between the software-defined networking and the postal service is a strong simplification and it gives only a limited viewpoint about the versatile possibilities provided by the software-defined networking.

The software defined networking is, however, not free from challenges. Some of the challenges are related to configuring the network elements so that different functional entities, e.g. line interface modules, of the network elements are constantly capable of carrying out the required tasks and so that the resources of the network elements are utilized in a sufficiently optimal way. Configuring a network element comprises defining a configuration system with the aid of which the network element is capable of operating as a part of a software-defined network. The configuration system should be such that it provides a desired functionality and, on the other hand, the configuration system should be implementable with the functional entities of the network element in a sufficiently efficient way. Therefore, there is still a need for technical solutions for defining configuration systems so that the resources of the network elements are utilized in a sufficiently optimal way.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new method for optimizing entity-specific configuration systems for functional entities of a network element of a software-defined network "SDN". Each functional entity can be, for example but not necessarily, a line interface module of the network element or a part of a line interface module such as an egress-side of the line interface module or an ingress-side of the line interface module. The entity-specific configuration systems are based on a network element-specific configuration system related to the whole network element and comprising configuration entries for determining operations to be carried out by the network element. The configuration system comprises typically one or more look-up tables and the configuration entries are the entries of the one or more look-up tables.

A method according to the invention comprises forming relation data that indicates, for each of the functional entities, at least one of those of the configuration entries which are irrelevant to the functional entity under consideration so that the operation of the functional entity under consideration is independent of these configuration entries.

The above-mentioned relation data enables the entity-specific configuration systems to be constructed so that the entity-specific configuration system of each functional entity is free from those of the configuration entries which, according to the relation data, are irrelevant to the functional entity under consideration. The resources for implementing the entity-specific configuration systems can be saved in the functional entities of the network element because at least a part of unnecessary configuration entries can be left out from the entity-specific configuration systems. This facilitates the implementation of the entity-specific configuration systems with the resources of the functional entities.

In accordance with the invention, there is provided also a new device for optimizing entity-specific configuration systems for functional entities of a network element of a software-defined network, where the entity-specific configuration systems are based on a network element-specific configuration system related to the whole network element and comprising configuration entries for determining operations to be carried out by the network element.

A device according to the invention comprises a processing system adapted to form relation data indicating, for each of the functional entities, at least one of those of the configuration entries which are irrelevant to the functional entity under consideration so that operation of the functional entity under consideration is independent of these configuration entries, the relation data enabling the entity-specific configuration systems to be constructed so that the entity-specific configuration system of each functional entity is free from those of the configuration entries which, according to the relation data, are irrelevant to the functional entity under consideration.

In accordance with the invention, there is provided also a new controller for configuring a network element of a software-defined network. The controller can be a single apparatus or a combination of a plurality of apparatuses capable of communicating with each other. A controller according to the invention comprises:

a processing system implementing a device according to the invention for optimizing entity-specific configuration systems for functional entities of the network element, and a data interface for sending, to the network element, configuration data for configuring the network element.

In accordance with the invention, there is provided also a new software-defined network that comprises one or more network elements and a controller according to the invention for configuring the one or more network elements. It is to be noted that the controller or one or more parts of it can also act as one or more network elements that can be e.g. an IP (Internet Protocol) router, a multiprotocol label switching "MPLS" node, a packet optical switch, and/or an Ethernet switch.

In accordance with the invention, there is provided also a new network element for a software-defined network. The network element can be, for example, an Internet Protocol "IP" router, a multiprotocol label switching "MPLS" switch, a packet optical switch, and/or an Ethernet switch. The network element may consist of a single apparatus or a combination of a plurality of apparatuses. A network element according to the invention comprises:

functional entities, e.g. line interface modules, for managing data received from the software-defined network and to be transmitted to the software-defined network, and a processing system for constructing entity-specific configuration systems for the functional entities so that the entity-specific configuration system of each functional entity is free from one or more of those of configuration entries which, according to relation data, are irrelevant to the functional entity under consideration, the entity-specific configuration systems being based on a network element-specific configuration system related to the whole network element and comprising the configuration entries for determining operations to be carried out by the network element, and the relation data indicating, for each of the functional entities, at least one of those of the configuration entries which are irrelevant to the functional entity under consideration so that operation of the functional entity under consideration is independent of these configuration entries In accordance with the invention, there is provided also a new computer program for optimizing entity-specific configuration systems for functional entities of a network element of a software-defined network, where the entity-specific configuration systems are based on a network element-specific configuration system related to the whole network element and comprising configuration entries for determining operations to be carried out by the network element.

A computer program according to the invention comprises computer executable instructions for controlling a programmable processing system to form relation data that indicates, for each of the functional entities, at least one of those of the configuration entries which are irrelevant to the functional entity under consideration so that operation of the functional entity under consideration is independent of these configuration entries, the relation data enabling the entity-specific configuration systems to be constructed so that the entity-specific configuration system of each functional entity is free from those of the configuration entries which, according to the relation data, are irrelevant to the functional entity under consideration.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied depending claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which.

DESCRIPTION OF EXEMPLIFYING EMBODIMENTS

Figure 1A:
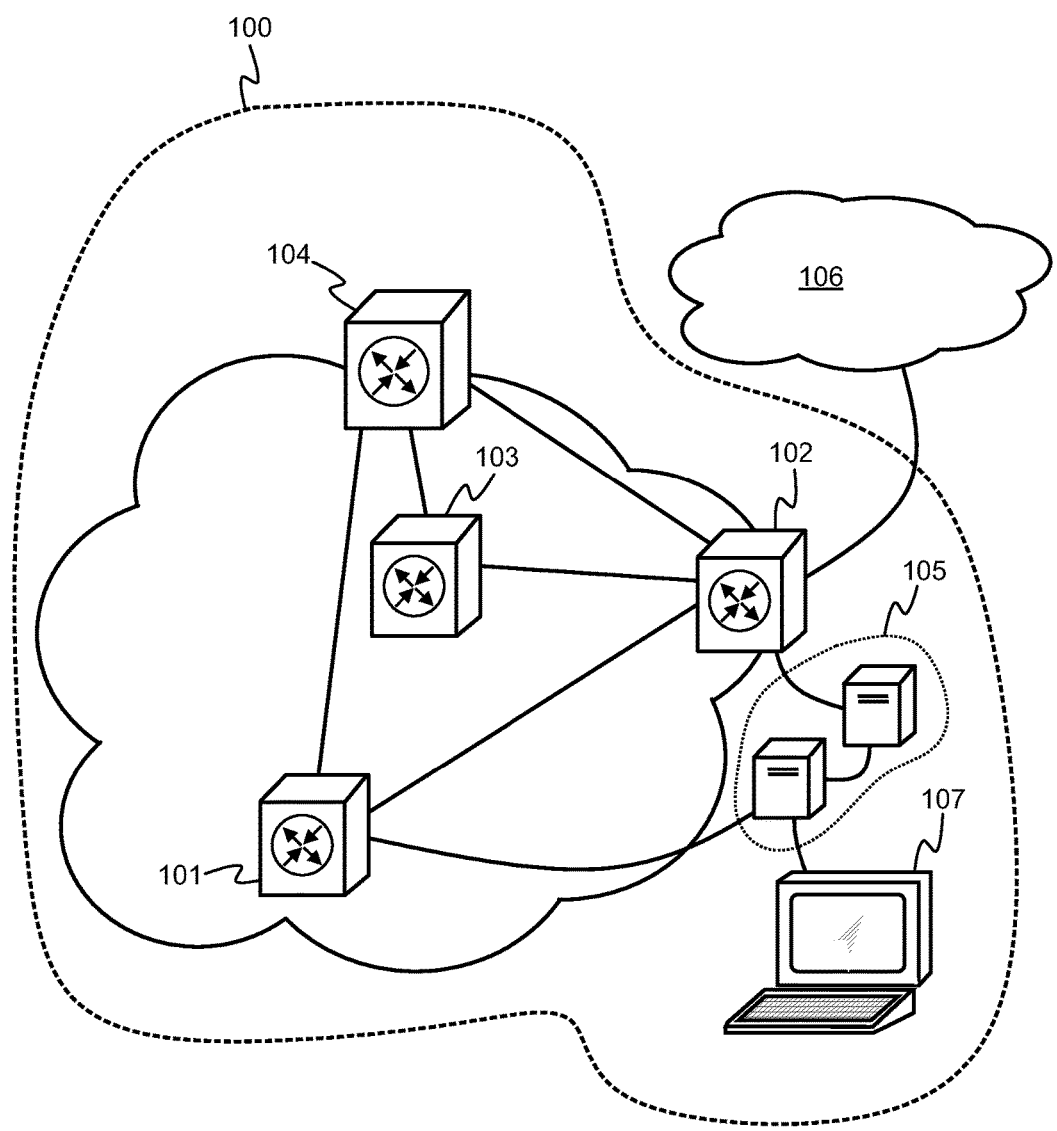
FIG. 1a shows a schematic illustration of a software-defined network where network elements are according to an exemplifying embodiment of the invention and/or a controller is according to an exemplifying embodiment of the invention.

FIG. 1a shows a schematic illustration of an exemplifying software-defined network "SDN" 100. The software-defined network comprises network elements 101, 102, 103, and 104 and a controller 105. The network elements 101-104 of this exemplifying software-defined network are mutually interconnected with data transfer links as illustrated in FIG. 1a. Furthermore, the exemplifying software-defined network "SDN" 100 may comprise other network elements that are not shown in FIG. 1a. Each of the network elements may be e.g. an Internet Protocol "IP" router, a multiprotocol label switching "MPLS" node, a packet optical switch, and/or an Ethernet switch. Each network element may consist of a single apparatus or a combination of a plurality of apparatuses. As well, the controller 105 may consist of a single apparatus or a combination of a plurality of apparatuses. In the exemplifying case illustrated in FIG. 1a, the controller 105 comprises two interconnected apparatuses. A terminal device 107 is connected to the controller 105 and the network element 102 acts as a gateway to an external network 106 that can be e.g. the global Internet. The controller 105 comprises a data transfer interface for receiving data from the terminal device 107 and/or from one or more other devices connected with data transfer links to the data transfer interface of the controller. It is to be noted that the controller 105 or one or more parts of it can also act as one or more network elements that can be e.g. an Internet Protocol "IP" router, a multiprotocol label switching "MPLS" node, a packet optical switch, and/or an Ethernet switch.

The controller 105 is adapted to send, to each of the network elements 101-104, configuration data that comprises data items for configuring the network element under consideration to maintain a configuration system that enables the network element to manage data frames in a desired manner. The controller 105 can be adapted to configure the network elements 101-104 in accordance with the ForCES or some other suitable protocol. More details about the ForCES can be found from the Request for Comments "RFC": 3746 "Forwarding and Control Element Separation", the Internet Engineering Task Force "IETF", Network Working Group. Furthermore, the configuration data that is sent to one or more of the network elements 101-104 may comprise one or more configuration programs each of which comprising one or more computer executable instructions defining an action or a chain of actions to be executed in conjunction with managing data frames in the network element under consideration. The action or the chain of actions defined by the configuration program may comprise for example: reading data from a data frame, modifying the data frame, selecting one or more of egress ports of the network element and forwarding the data frame and its possible duplicates to the selected one or more egress ports, selecting one of the look-up tables of the look-up system and executing a look-up from the selected look-up table, performing arithmetic operations, branching operations, performing logical operations, reading metadata associated with the data frame, writing metadata associated with the data frame, modifying metadata associated with the data frame, dropping the data frame, and/or duplicating the data frame.

At least one of the network elements 101-104 is assumed have a modular structure so that the network element under consideration comprises one or more functional entities which may comprise, for example, line-interface modules and/or one or more other modules such as a control module. Each functional entity may comprise a control processor section for maintaining an entity-specific configuration system that comprises configuration entries defining actions to be executed in conjunction with managing data frames, and a data forwarding section for managing the data frames in accordance with the entity-specific configuration system.

In a software-defined network according to an exemplifying embodiment of the invention, at least one of the network elements 101-104 is adapted to optimize the entity-specific configuration systems related to the functional entities of the network element under consideration. The entity-specific configuration systems are based on a network element-specific configuration system that is related to the whole network element and comprises the configuration entries for determining operations to be carried out by the network element. The network element is adapted to form relation data that indicates, for each of the functional entities, those of the configuration entries which are irrelevant to the functional entity under consideration so that the operation of the functional entity under consideration is independent of these configuration entries. Furthermore, the network element is adapted to construct the entity-specific configuration systems to so that the entity-specific configuration system of each functional entity is free from one or more of those of the configuration entries which, according to the relation data, are irrelevant to the functional entity under consideration.

Figure 1B:
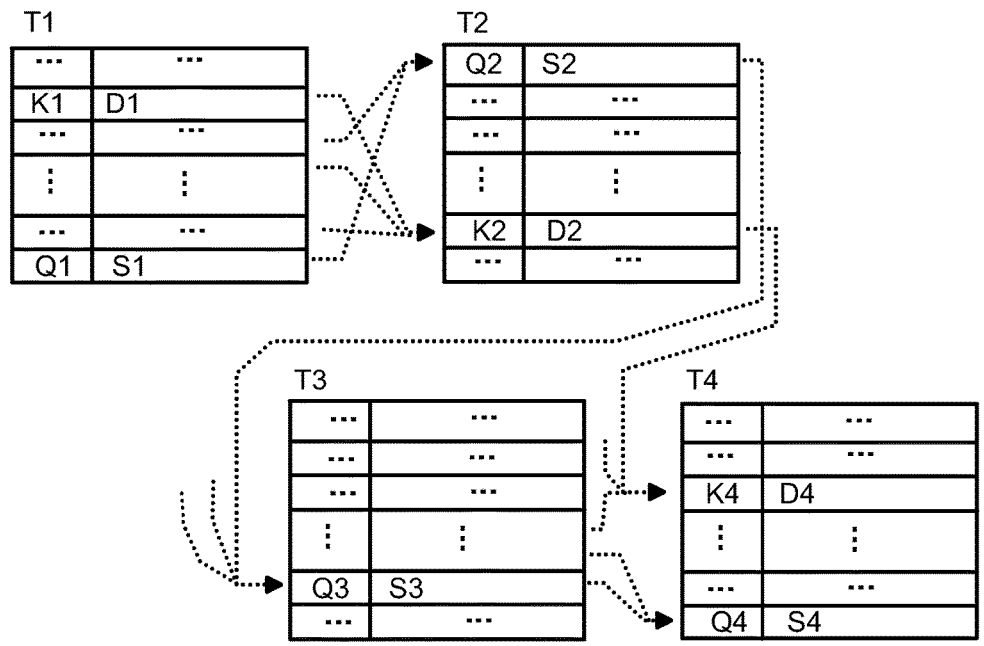
FIG. 1b illustrates an example of a network element-specific configuration system and FIG. 1c illustrates an example of an entity-specific configuration system.
Figure 1C:
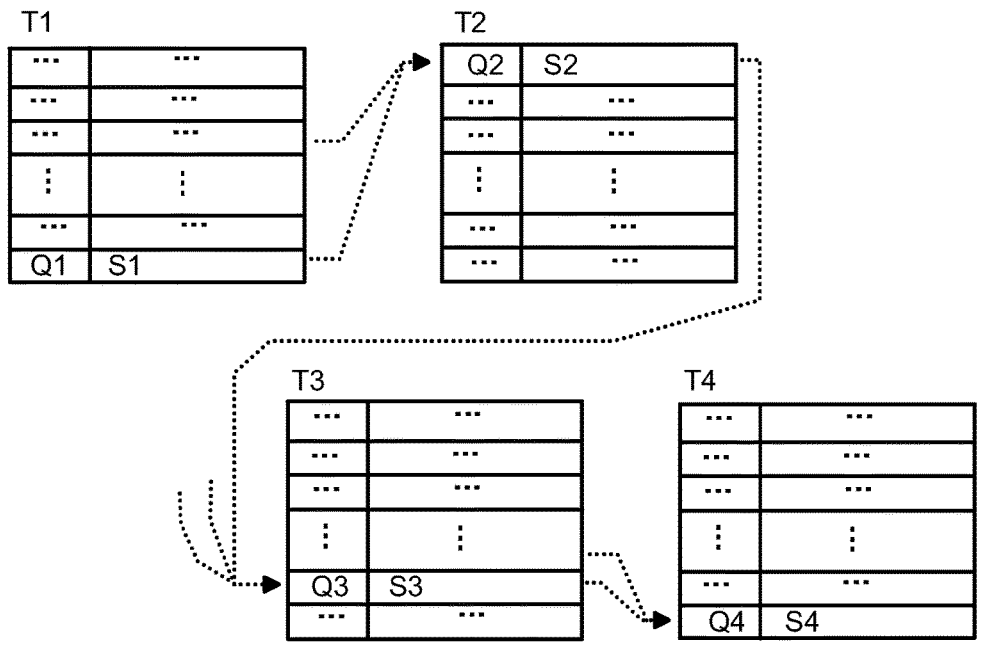

The above-presented principle for optimizing the entity-specific configuration systems is illustrated below with the aid of FIGS. 1b and 1c. FIG. 1b illustrates an example of a network element-specific configuration system. The exemplifying configuration system illustrated in FIG. 1b comprises look-up tables T1, T2, T3 and T4. The rows of the look-up tables represent configuration entries so that each configuration entry, i.e. a row, comprises a look-up reference e.g. K1 which is compared to a look-up key so as to determine whether the configuration entry under consideration is to be accessed. Furthermore, each configuration entry, i.e. a row, comprises an action descriptor e.g. D1 defining one or more actions to be carried out when the configuration entry under consideration has been accessed. Dashed line arrows shown in FIG. 1b illustrate exemplifying transitions between the look-up tables. For example, the one or more actions defined by the configuration entry "Q1 S1" of the look-up table T1 may produce a reference to the look-up table T2 and a look-up key that matches with Q2. Thus, there will be a transition from the configuration entry "Q1 S1" of the look-up table T1 to the configuration entry "Q2 S2" of the look-up table T2. As can be seen from FIG. 1b, there are, among others, the following possible look-up sequences of successive configuration entries: "Q1 S1"-"Q2 S2"-"Q3 S3"-"Q4 S4" and "K1 D1"-"K2 D2"-"K4 D4".

The configuration entry "Q1 S1" can be accessed for example in a case where a data frame has been received at a particular physical ingress port of a particular functional entity e.g. a particular line-interface module. The actions defined by the configuration entry "Q1 S1" may involve for example inspecting a virtual local access network identifier "VLAN ID" from the received data frame and determining a virtual routing and forwarding table identifier "VRF ID" on the basis of the inspected VLAN ID. If, for example, the determined VRF ID is on a given range, the actions defined by the configuration entry "Q1 S1" may involve performing a look-up from the look-up table T2 using the determined VRF ID as the look-up key. If the determined VRF ID happens to match with Q2, then the configuration entry "Q2 S2" is accessed. The configuration entry "Q2 S2" can, in turn, determine metadata which is used in one or more look-ups carried out with the look-up tables T3 and/or T4. The operation can be cumulative in the sense that metadata determined with two or more preceding look-up tables can be used in one or more lookups carried out with the following look-up table, e.g. the metadata determined with all the look-up tables T1, T2 and T3 can be used in one or more look-ups carried out with the look-up table T4. Operation of the kind exemplified above continues until the final action has been carried out. The final action can be, for example, forwarding the data frame via a certain physical egress port of a certain functional entity, or discarding the data frame.

In the exemplifying case illustrated in FIG. 1b, we assume that the configuration entries "Q1 S1", "Q2 S2", "Q3 S3" and "Q4 S4" are related to actions where a first functional entity, e.g. a first line-interface module, of the network element is directly or indirectly involved. We further assume that the configuration entries "K1 D1", "K2 D2", and "K4 D4" are irrelevant to the first functional entity so that the operation of the first functional entity is, in all situations, independent of the existence of these configuration entries "K1 D1", "K2 D2", and "K4 D4". For example, each of the configuration entries "K1 D1", "K2 D2", and "K4 D4" can be such that they are never accessed when a data frame is received at the first functional entity or when a data frame is transmitted via the first functional entity or when some other particular operation takes place. In this case, it is advantageous to construct the entity-specific configuration system for the first functional entity so that the entity-specific configuration system is free from the configuration entries "K1 D1", "K2 D2", and "K4 D4" that are irrelevant to the first functional entity. FIG. 1c illustrates the entity-specific configuration system of the first functional entity. As can be seen from FIG. 1c, the needless configuration entries "K1 D1", "K2 D2", and "K4 D4" have been left out from the entity-specific configuration system of the first functional entity.

The configuration entries which are irrelevant to a functional entity under consideration can be found, for example, by generating test look-up sequences each comprising successive configuration entries so that a previous configuration entry determines one or more next configuration entries. The test look-up sequences can be used for simulating, for example, cases where data frames are received at a certain functional entity only. In many cases, by varying the input data used for the simulation, one can find out which of the configuration entries of the network element-specific configuration system are never accessed in cases where data frames are received merely at the functional entity under consideration. In some cases, it is possible to move backwards in the network element-specific configuration system when the last action, e.g. forwarding a data frame via a certain egress port, is known. In these cases, the test look-up sequences can be constructed to correspond to a situation where data frames are transmitted via a certain functional entity only. The test look-up sequences can be used for finding out which of the configuration entries of the network element-specific configuration system are never accessed in cases where data frames are transmitted merely via the functional entity under consideration. The information obtained with the aid of the test look-up sequences can be used for forming the relation data that indicates, for each of the functional entities, those of the configuration entries which are irrelevant to the functional entity under consideration so that operation of the functional entity under consideration is independent of these configuration entries.

Test look-up sequences for finding the irrelevant configuration entries can be constructed also by finding anchoring configuration entries, e.g. ports, and by following up any metadata related directly or indirectly to the anchoring configuration entries and then correlating this metadata with configuration entries in sub-sequent and/or preceding look-up tables of the network element-specific configuration system. This could be considered as graph reachability problem. Also fixed fields, such as port numbers, in subsequent and/or preceding look-up tables can be used. Typical examples for the anchoring configuration entries would be for example:

A virtual routing and forwarding table identifier "VRF ID" assigned in a port or in a combination of a port and virtual local access network "VLAN" look-up used to limit Internet Protocol "IP" lookup entries to those functional entities, e.g. line interface modules, which have a particular VRF.

MultiProtocol Label Switching Incoming label Map "MPLS ILM" entries limited to those functional entities which have a port and VLAN combination that MPLS ILM entry refers to directly or indirectly via a label-space assigned in a port and VLAN combination lookup referred in MPLS ILM table.

Egress modification entry, e.g. MPLS label push, limited to functional entities where output action points to.

A Bridge identifier "Bridge ID" related to Ethernet switching and metadata assigned by a port lookup used to limit both VLAN lookup entries and Media Access Control "MAC" forwarding entries in subsequent lookup tables.

Layer 3 "L3" Integrated Routing and Bridging "IRB" entries based on bridge ID and metadata assigned by VLAN lookup in subsequent tables.

In a software-defined network according to an exemplifying embodiment of the invention, the controller 105 is adapted to optimize the entity-specific configuration systems related to the functional entities of at least one of the network elements 101-104. In this case, the controller 105 has an access to data defining the modular structures of the network elements under consideration and the connections of the functional entities of the network elements to the data transfer links of the software-defined network 100. The controller 105 is adapted to form the relation data that indicates, for each of the functional entities of the network element under consideration, those of the configuration entries which are irrelevant to the functional entity under consideration so that operation of the functional entity under consideration is independent of these configuration entries. The controller 105 can be adapted to construct the entity-specific configuration systems for the network element under consideration so that the entity-specific configuration system of each functional entity is free from one or more of those of the configuration entries which, according to the relation data, are irrelevant to the functional entity under consideration, and to set the configuration data to be sent to the network element to express the entity-specific configuration systems. It is also possible that the controller is adapted to send the relation data together with the other configuration data to the network element so as to enable the network element to optimize the entity-specific configuration systems on the basis of the relation data. In order to be able to construct the network element-specific configuration systems for the one or more of the network elements 101-104, the controller has a priori knowledge about different data flows which may take place in the software-defined network 100. The entity-specific configuration systems can be optimized on the basis of this knowledge and the above-mentioned data defining the connections of the functional entities of the network elements to the data transfer links of the software-defined network.

Figure 2:
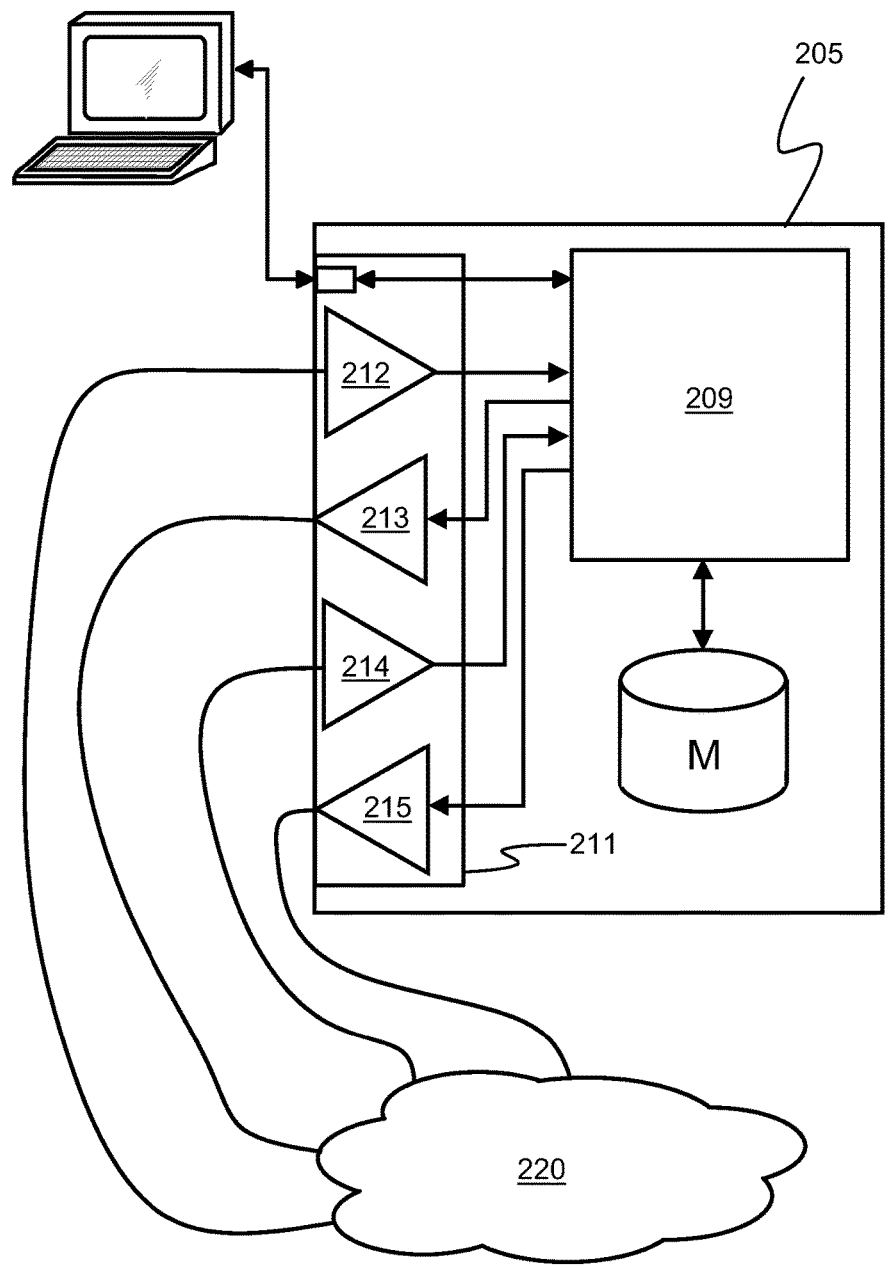
FIG. 2 shows a schematic illustration of a controller according to an exemplifying embodiment of the invention for configuring a network element of a software-defined network.

FIG. 2 shows a schematic illustration of a controller 205 according to an exemplifying embodiment of the invention for configuring a network element of a software-defined network. In this exemplifying case, the controller is a single apparatus but, as mentioned earlier in this document, the controller could as well be a combination of a plurality of apparatuses. The controller comprises a data transfer interface 211 for receiving data and for transmitting data. The data transfer interface 211 comprises ingress ports 212 and 214 and egress ports 213 and 215 for connecting via data transfer links to a data transfer network 220. The controller comprises a processing system 209 adapted to construct configuration data that enables the network element to be configured to operate as a part of the software-defined network. The processing system 209 is further adapted to control the data transfer interface 211 to send the configuration data to the network element to be configured.

The controller 205 comprises a device for optimizing entity-specific configuration systems for functional entities of the network element to be configured. The entity-specific configuration systems are based on a network element-specific configuration system related to the whole network element and comprising configuration entries for determining operations to be carried out by the network element. The device is adapted to form relation data that indicates, for each of the functional entities, those of the configuration entries which are irrelevant to the functional entity under consideration so that operation of the functional entity under consideration is independent of these configuration entries. The above-mentioned device for optimizing the entity-specific configuration systems can be implemented with the processing system 209.

In a controller according to an exemplifying embodiment of the invention, the processing system 209 is adapted to construct the entity-specific configuration systems so that the entity-specific configuration system of each functional entity is free from one or more of those of the configuration entries which, according to the relation data, are irrelevant to the functional entity under consideration, and to set the configuration data to be sent to the network element to express the entity-specific configuration systems.

In a controller according to an exemplifying embodiment of the invention, the processing system 209 is adapted to set the configuration data to be sent to the network element to express the network element-specific configuration system and to contain the relation data so as to enable the network element to construct the entity-specific configuration systems. The relation data can be encoded for example into bit vectors related to the configuration entries of the network element-specific configuration system so that each bit position of the bit vectors represents one of the functional entities. A bit representing a given functional entity in a bit vector related to a given configuration entry can be e.g. '1' when the configuration entry is relevant to the functional entity under consideration and '0' when the configuration entry is irrelevant to the functional entity under consideration. It is also possible that each configuration entry is associated with a list of identifiers of those functional entities to which the configuration entry under consideration is relevant.

The processing system 209 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
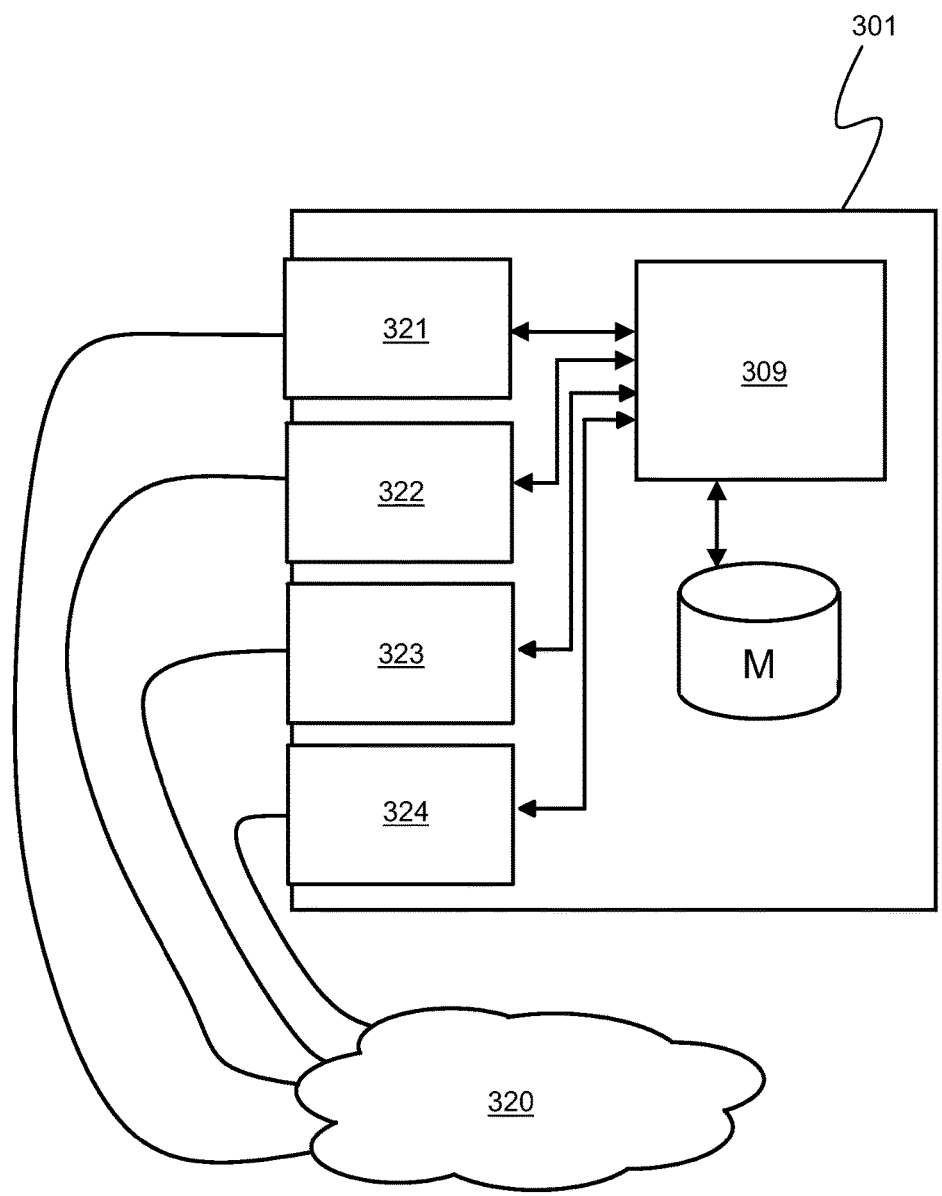
FIG. 3 shows a schematic illustration of a network element according to an exemplifying embodiment of the invention.

FIG. 3 shows a schematic illustration of a network element 301 according to an exemplifying embodiment of the invention. The network element can be, for example, an Internet Protocol "IP" router, a Multiprotocol label switching "MPLS" switch, a packet optical switch, and/or an Ethernet switch. The network element comprises functional entities 321, 322, 323 and 324 for receiving data from a software-defined network 320 and for transmitting data to the software-defined network. The functional entities 321-324 can be, for example, physical line interface modules. Each of the functional entities 321-324 comprises a control processor section for maintaining an entity-specific configuration system that comprises configuration entries defining actions to be executed in conjunction with managing data frames, and a data forwarding section for managing the data frames in accordance with the entity-specific configuration system. The entity-specific configuration system of each functional entity is based on a network element-specific configuration system related to the whole network element and comprising configuration entries for determining operations to be carried out by the network element. The network element comprises a processing system 309 for constructing the entity-specific configuration systems for the functional entities 321-324 so that the entity-specific configuration system of each functional entity is free from one or more of those of the configuration entries which are irrelevant to the functional entity under consideration.

A network element according to an exemplifying embodiment of the invention is adapted to receive, from a controller of the software-defined network 320, configuration data expressing the network element-specific configuration system. The processing system 209 is adapted to form relation data that indicates, for each of the functional entities 321-324, at least one of those of the configuration entries of network element-specific configuration system which are irrelevant to the functional entity under consideration so that operation of the functional entity under consideration is independent of these configuration entries, the relation being used when constructing the entity-specific configuration systems.

A network element according to another exemplifying embodiment of the invention is adapted to receive the above-mentioned relation data from the controller of the software-defined network.

The processing system 309 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

In the above described network element, the processing system 309 is adapted to optimize the entity-specific configuration systems for the functional entities 321-324. It is also possible that a processing system of one of the functional entities 321-324 is adapted to optimize the entity-specific configuration systems for the functional entities 321-324. Furthermore, it is also possible that each of the functional entities 321-324 is adapted to optimize the entity-specific configuration system for itself.

Figure 4:
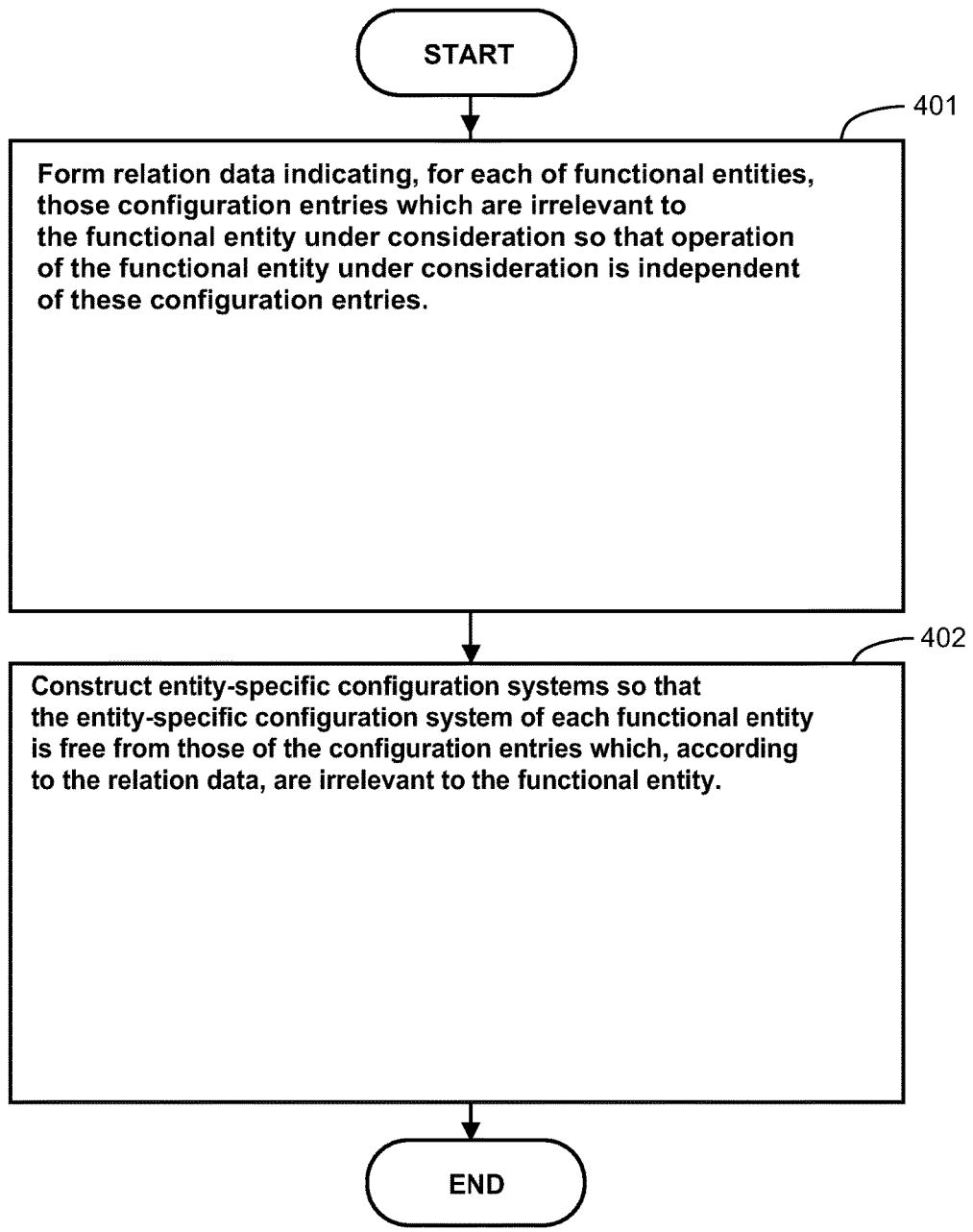
FIG. 4 shows a flow chart of a method according to an exemplifying embodiment of the invention for optimizing entity-specific configuration systems for functional entities of a network element of a software-defined network.

FIG. 4 shows a flow chart of a method according to an exemplifying embodiment of the invention for optimizing entity-specific configuration systems for functional entities of a network element of a software-defined network, where the entity-specific configuration systems are based on a network element-specific configuration system related to the whole network element and comprising configuration entries for determining operations to be carried out by the network element. The method comprises forming 401 relation data that indicates, for each of the functional entities, those of the configuration entries which are irrelevant to the functional entity under consideration so that operation of the functional entity under consideration is independent of these configuration entries. The relation data enables the entity-specific configuration systems to be constructed so that the entity-specific configuration system of each functional entity is free from those of the configuration entries which, according to the relation data, are irrelevant to the functional entity under consideration.

A method according to an exemplifying embodiment of the invention comprises constructing 402 the entity-specific configuration systems so that the entity-specific configuration system of each functional entity is free from one or more of those of the configuration entries which, according to the relation data, are irrelevant to the functional entity under consideration.

A method according to an exemplifying embodiment of the invention comprises generating test look-up sequences so as to find out which of the configuration entries are irrelevant to each of the functional entities. Each test look-up sequence comprises successive configuration entries of the network element-specific configuration system so that a previous configuration entry determines one or more next configuration entries.

In a method according to an exemplifying embodiment of the invention, the test look-up sequences are generated so that the test look-up sequences correspond to a situation in which data frames are received at only one of the functional entities so as to find out those of the configuration entries which are never accessed when data frames are received at only the one of the functional entities.

In a method according to an exemplifying embodiment of the invention, the test look-up sequences are generated so that the test look-up sequences correspond to a situation in which data frames are transmitted via only one of the functional entities so as to find out those of the configuration entries which are never accessed when data frames are transmitted via only the one of the functional entities.

Test look-up sequences for finding the irrelevant configuration entries can be constructed also by finding anchoring configuration entries, e.g. ports, and by following up any metadata related directly or indirectly to the anchoring configuration entries and then correlating this metadata with configuration entries in sub-sequent and/or preceding look-up tables of the network element-specific configuration system. This could be considered as graph reachability problem. Also fixed fields, such as port numbers, in subsequent and/or preceding look-up tables can be used.

A method according to an exemplifying embodiment of the invention comprises finding out the at least one of those of the configuration entries which are irrelevant to the functional entity under consideration on the basis of knowledge about different data flows capable of occurring in the software-defined network and data defining connections of the functional entities of the network element to data transfer links of the software-defined network.

A computer program according to an exemplifying embodiment of the invention for optimizing the above-mentioned entity-specific configuration systems comprises computer executable instructions for controlling a programmable processing system to carry out a method according to any of the above-described exemplifying embodiments of the invention.

A computer program according to an exemplifying embodiment of the invention comprises software modules for optimizing entity-specific configuration systems for functional entities of a network element of a software-defined network, where the entity-specific configuration systems are based on a network element-specific configuration system related to the network element and comprising configuration entries for determining operations to be carried out by the network element. The software modules comprise computer executable instructions for controlling a programmable processing system to form relation data indicating, for each of the functional entities, those of the configuration entries which are irrelevant to the functional entity under consideration so that operation of the functional entity under consideration is independent of these configuration entries.

In a computer program according to an exemplifying embodiment of the invention, the software modules further comprise computer executable instructions for controlling the programmable processing system to construct the entity-specific configuration systems so that the entity-specific configuration system of each functional entity is free from one or more of those of the configuration entries which, according to the relation data, are irrelevant to the functional entity under consideration.

The software modules can be e.g. subroutines or functions implemented with a suitable programming language and with a compiler suitable for the programming language and the programmable processing system.

A computer program product according to an exemplifying embodiment of the invention comprises a computer readable medium, e.g. a compact disc ("CD"), encoded with a computer program according to an exemplifying embodiment of invention.

A signal according to an exemplifying embodiment of the invention is encoded to carry information defining a computer program according to an exemplifying embodiment of invention.

The specific examples provided in the description given above should not be construed as limiting the scope and/or the applicability of the appended claims.

What is claimed is:

1. A device for optimizing entity-specific configuration systems for functional entities of a network element of a software-defined network, the entity-specific configuration systems being based on a network element-specific configuration system related to the network element and comprising configuration entries for determining operations to be carried out by the network element, the device comprising:

a processing system, said processing system adapted to:

search from the network element-specific configuration system, for each of the functional entities, at least one of those of the configuration entries which are irrelevant to the functional entity under consideration so that operation of the functional entity under consideration is independent of these configuration entries, form relation data indicating, from among the network element-specific configuration system for each of the functional entities, the searched at least one of those of the configuration entries which are irrelevant to the functional entity under consideration so that the operation of the functional entity under consideration is independent of these configuration entries, and construct the entity-specific configuration systems based on the configuration entries of the network element-specific configuration system so that each configuration entry which, according to the relation data, is irrelevant to the functional entity under consideration is left out from the entity-specific configuration system of the functional entity under consideration.

2. The device according to claim 1, wherein the processing system is adapted to generate test look-up sequences so as to find out the at least one of those of the configuration entries which are irrelevant to the functional entity, each test look-up sequence comprising successive configuration entries of the network element-specific configuration system so that a previous configuration entry determines one or more next configuration entries.

3. The device according to claim 2, wherein the processing system is adapted to generate the test look-up sequences so that the test look-up sequences correspond to a situation in which data frames are received at only one of the functional entities so as to find out at least one of those of the configuration entries which are never accessed when the data frames are received at only the one of the functional entities.

4. The device according to claim 2, wherein the processing system is adapted to generate the test look-up sequences so that the test look-up sequences correspond to a situation in which data frames are transmitted via only one of the functional entities so as to find out at least one of those of the configuration entries which are never accessed when the data frames are transmitted via only the one of the functional entities.

5. The device according to claim 1, wherein the processing system is adapted to find out the at least one of those of the configuration entries which are irrelevant to the functional entity on the basis of knowledge about different data flows capable of occurring in the software-defined network and data defining connections of the functional entities of the network element to data transfer links of the software-defined network.

6. A controller for configuring a network element of a software-defined network, the controller comprising:

a processing system implementing a device for optimizing entity-specific configuration systems for functional entities of the network element, the entity-specific configuration systems being based on a network element-specific configuration system related to the network element and comprising configuration entries for determining operations to be carried out by the network element; and a data interface for sending, to the network element, configuration data for configuring the network element, wherein the device is adapted to:

search from the network element-specific configuration system, for each of the functional entities, at least one of those of the configuration entries which are irrelevant to the functional entity under consideration so that operation of the functional entity under consideration is independent of these configuration entries, form relation data indicating, from among the network element-specific configuration system for each of the functional entities, the searched at least one of those of the configuration entries which are irrelevant to the functional entity under consideration so that the operation of the functional entity under consideration is independent of these configuration entries, and construct the entity-specific configuration systems based on the configuration entries of the network element-specific configuration system so that each configuration entry which, according to the relation data, is irrelevant to the functional entity under consideration is left out from the entity-specific configuration system of the functional entity under consideration.

7. The controller according to claim 6, wherein the processing system is adapted to construct the entity-specific configuration systems so that the entity-specific configuration system of each functional entity is free from one or more of those of the configuration entries which, according to the relation data, are irrelevant to the functional entity under consideration, and to set the configuration data to express the entity-specific configuration systems.

8. The controller according to claim 6, wherein the processing system is adapted to set the configuration data to express the network element-specific configuration system and to contain the relation data so as to enable the network element to construct the entity-specific configuration systems.

9. A network element for a software-defined network, the network element being adapted to receive, from a controller of the software-defined network, configuration data expressing a network element-specific configuration system related to the network element and comprising configuration entries for determining operations to be carried out by the network element, the network element comprising:

functional entities for managing data received from the software-defined network and to be transmitted to the software-defined network; and a processing system for constructing entity-specific configuration systems for the functional entities so that the entity-specific configuration system of each functional entity is free from one or more of those of the configuration entries which, according to relation data, are irrelevant to the functional entity under consideration, the entity-specific configuration systems being based on the network element-specific configuration system related to the network element and comprising the configuration entries for determining the operations to be carried out by the network element so that each configuration entry which, according to the relation data, is irrelevant to the functional entity under consideration is left out from the entity-specific configuration system of the functional entity under consideration, and the relation data indicating, from among the network element-specific configuration system for each of the functional entities, at least one of those of the configuration entries which are irrelevant to the functional entity under consideration so that operation of
the functional entity under consideration is independent
of these configuration entries.

10. The network element according to claim 9, wherein the processing system is adapted to implement a device for forming the relation data.

11. The network element according to claim 9, wherein the network element is adapted to receive the relation data from the controller of the software-defined network.

12. The network element according to claim 9, wherein the functional entities are line interface modules.

13. A method for optimizing entity-specific configuration systems for functional entities of a network element of a software-defined network, the entity-specific configuration systems being based on a network element-specific configuration system related to the network element and comprising configuration entries for determining operations to be carried out by the network element, the method comprising:
    searching from the network element-specific configuration system, for each of the functional entities, at least one of those of the configuration entries which are irrelevant to the functional entity under consideration so that operation of the functional entity under consideration is independent of these configuration entries,
    forming relation data indicating, from among the network element-specific configuration system for each of the functional entities, the searched at least one of those of the configuration entries which are irrelevant to the functional entity under consideration so that operation of the functional entity under consideration is independent of these configuration entries, and
    constructing the entity-specific configuration systems based on the configuration entries of the network element-specific configuration system so that each configuration entry which, according to the relation data, is irrelevant to the functional entity under consideration is left out from the entity-specific configuration system of the functional entity under consideration.

14. The method according to claim 13, wherein the method comprises generating test look-up sequences so as to find out the at least one of those of the configuration entries which are irrelevant to the functional entity, each test look-up sequence comprising successive configuration entries of the network element-specific configuration system so that a previous configuration entry determines one or more next configuration entries.

15. The method according to claim 14, wherein the test look-up sequences are generated so that the test look-up sequences correspond to a situation in which data frames are received at only one of the functional entities so as to find out at least one of those of the configuration entries which are never accessed when data frames are received at only the one of the functional entities.

16. The method according to claim 15, wherein the test look-up sequences are generated so that the test look-up sequences correspond to a situation in which data frames are transmitted via only one of the functional entities so as to find out at least one of those of the configuration entries which are never accessed when data frames are transmitted via only the one of the functional entities.

17. The method according to claim 13, wherein the method comprises finding out the at least one of those of the configuration entries which are irrelevant to the functional entity on the basis of knowledge about different data flows capable of occurring in the software-defined network and data defining connections of the functional entities of the network element to data transfer links of the software-defined network.

18. A non-transitory computer readable medium encoded with a computer program for optimizing entity-specific configuration systems for functional entities of a network element of a software-defined network, the entity-specific configuration systems being based on a network element-specific configuration system related to the network element and comprising configuration entries for determining operations to be carried out by the network element, the computer program comprised of computer executable instructions for controlling a programmable processing system to:
    search from the network element-specific configuration system, for each of the functional entities, at least one of those of the configuration entries which are irrelevant to the functional entity under consideration so that operation of the functional entity under consideration is independent of these configuration entries,
    form relation data indicating, from among the network element-specific configuration system for each of the functional entities, the searched at least one of those of the configuration entries which are irrelevant to the functional entity under consideration so that operation of the functional entity under consideration is independent of these configuration entries, and
    construct the entity-specific configuration systems based on the configuration entries of the network element-specific configuration system so that each configuration entry which, according to the relation data, is irrelevant to the functional entity under consideration is left out from the entity-specific configuration system of the functional entity under consideration.

* * * * *